(12) United States Patent
Dutt et al.

(10) Patent No.: US 10,880,556 B2
(45) Date of Patent: *Dec. 29, 2020

(54) METHODS AND SYSTEMS FOR MASKING MULTIMEDIA DATA

(71) Applicant: TEXAS INSTRUMENTS INCORPORATED, Dallas, TX (US)

(72) Inventors: Yashwant Dutt, Karnataka (IN);
Kumar Desappan, Karnataka (IN);
Piyali Goswami, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,527

(22) Filed: Dec. 7, 2018

(65) Prior Publication Data

US 2019/0116364 A1    Apr. 18, 2019

Related U.S. Application Data

(63) Continuation of application No. 15/063,234, filed on Mar. 7, 2016, now Pat. No. 10,200,695, which is a continuation of application No. 13/417,896, filed on Mar. 12, 2012, now Pat. No. 9,282,333.

(30) Foreign Application Priority Data

Mar. 18, 2011    (IN) .............................. 835/CHE/2011

(51) Int. Cl.
*H04N 19/167*    (2014.01)
*H04N 19/103*    (2014.01)
*H04N 19/176*    (2014.01)
*H04N 19/124*    (2014.01)
*H04N 19/157*    (2014.01)

(52) U.S. Cl.
CPC ......... *H04N 19/167* (2014.11); *H04N 19/103* (2014.11); *H04N 19/124* (2014.11); *H04N 19/157* (2014.11); *H04N 19/176* (2014.11)

(58) Field of Classification Search
CPC ........... H04N 7/26085; H04N 7/26079; H04N 7/26271

See application file for complete search history.

(56) References Cited

U.S. PATENT DOCUMENTS

| 9,282,333 B2 | 3/2016 | Dutt et al. | |
| 2006/0013495 A1* | 1/2006 | Duan | G06K 9/38 |
| | | | 382/235 |
| 2006/0018385 A1* | 1/2006 | Lee | H04N 19/176 |
| | | | 375/240.24 |

(Continued)

*Primary Examiner* — Tsion B Owens
(74) *Attorney, Agent, or Firm* — Ebby Abraham; Charles A. Brill; Frank D. Cimino

(57) ABSTRACT

Several methods and systems for masking multimedia data are disclosed. In an embodiment, a method for masking includes performing a prediction for at least one multimedia data block based on a prediction mode of a plurality of prediction modes. The at least one multimedia data block is associated with a region of interest (ROI). A residual multimedia data associated with the at least one multimedia data block is generated based on the prediction. A quantization of the residual multimedia data is performed based on a quantization parameter (QP) value. The QP value is variable such that varying the QP value controls a degree of masking of the ROI.

20 Claims, 8 Drawing Sheets

(56) References Cited

U.S. PATENT DOCUMENTS

| | | | | |
|---|---|---|---|---|
| 2008/0117295 A1* | 5/2008 | Ebrahimi | .......... | G08B 13/19604 |
| | | | | 348/143 |
| 2010/0124274 A1* | 5/2010 | Cheok | .................. | H04N 19/176 |
| | | | | 375/240.03 |
| 2010/0281449 A1* | 11/2010 | RosenBluth | .............. | G03F 1/70 |
| | | | | 716/53 |
| 2011/0085035 A1* | 4/2011 | Choi | ...................... | H04N 1/448 |
| | | | | 348/143 |
| 2011/0090960 A1* | 4/2011 | Leontaris | ............. | H04N 19/103 |
| | | | | 375/240.12 |

* cited by examiner

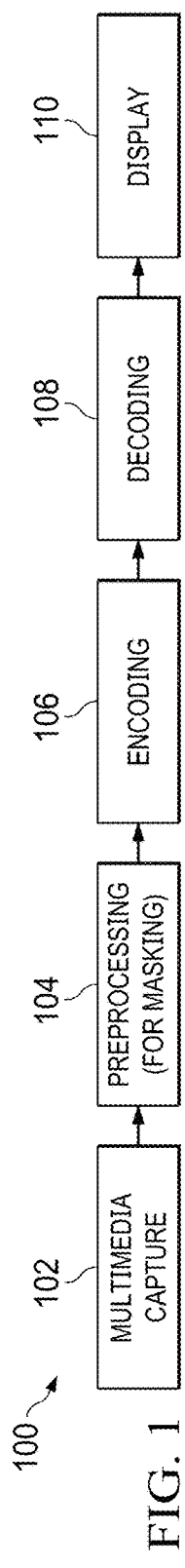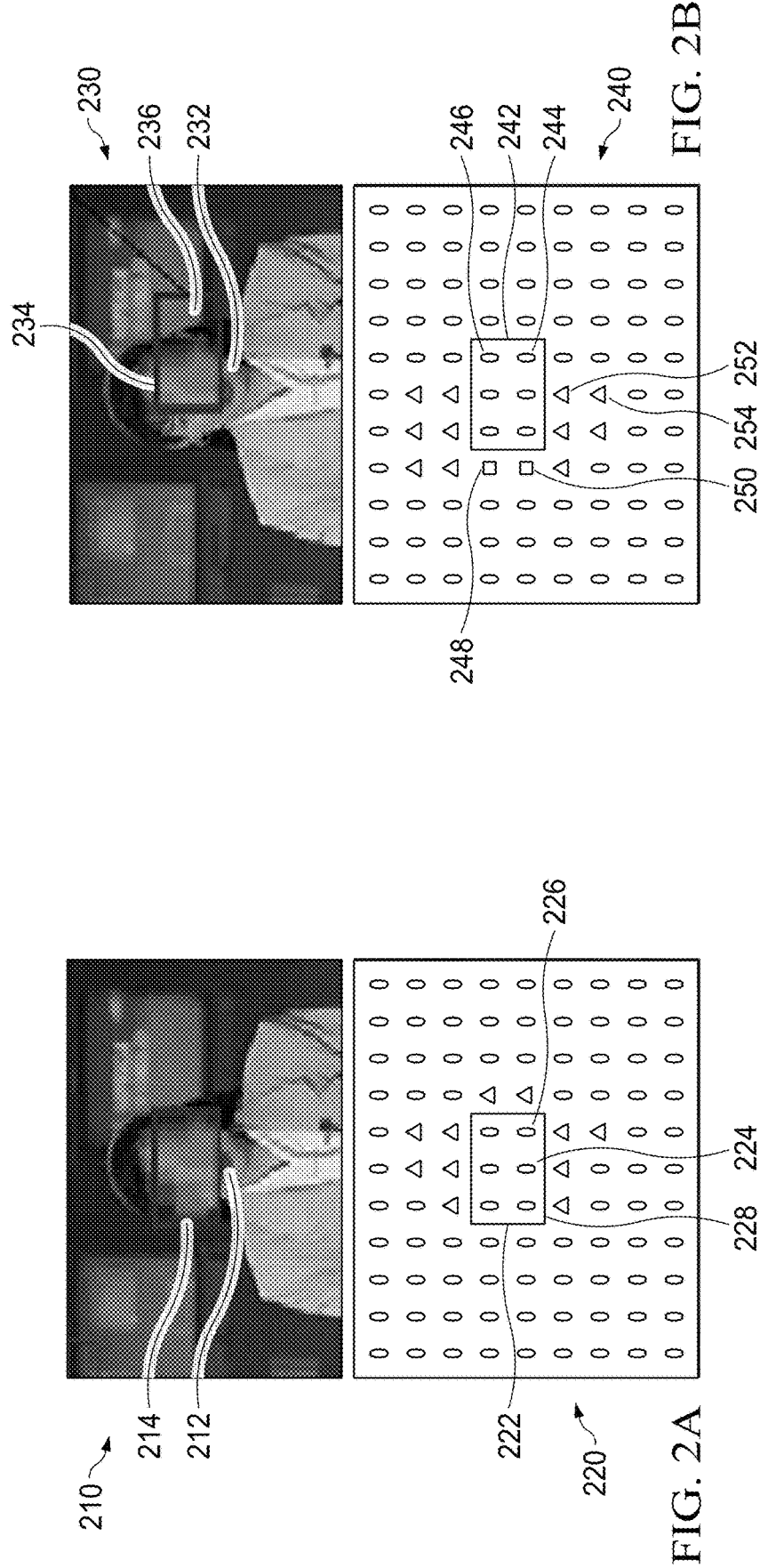

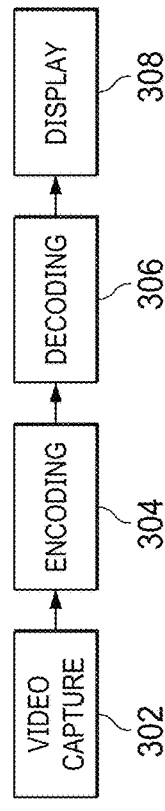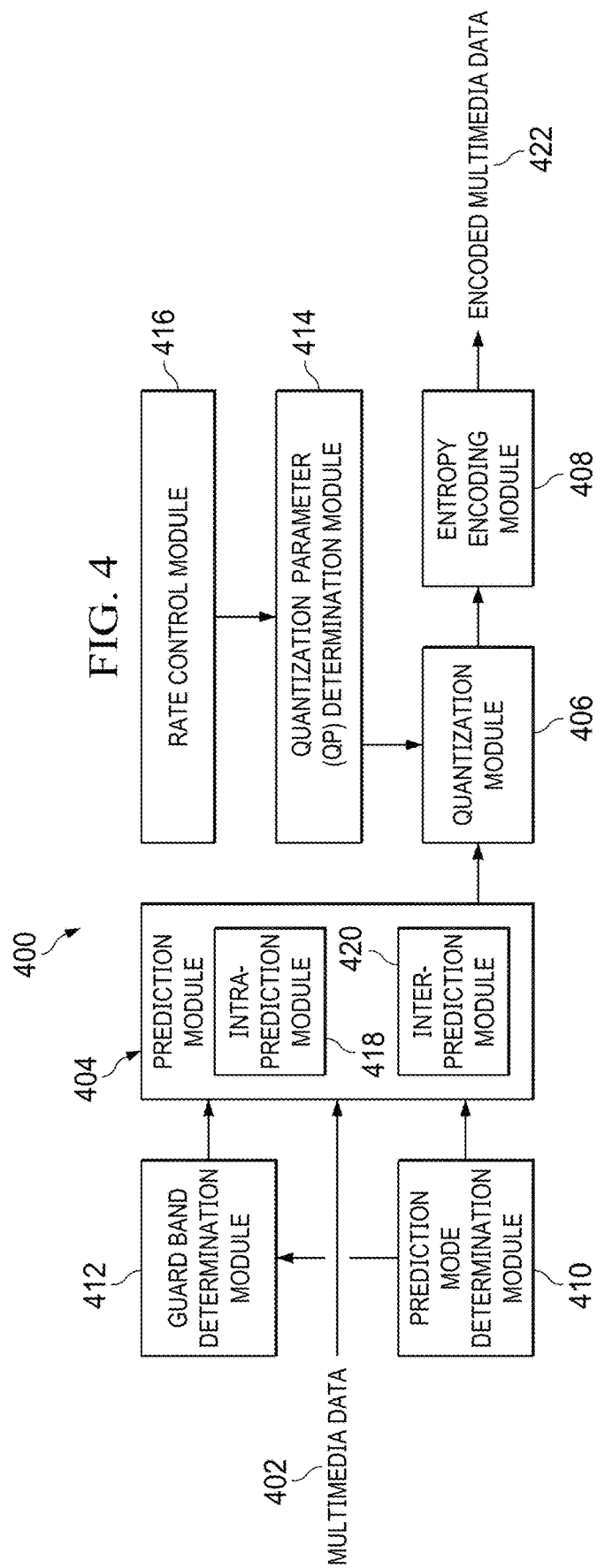

METHODS AND SYSTEMS FOR MASKING MULTIMEDIA DATA

CROSS REFERENCE TO RELATED APPLICATIONS

This application is a continuation of U.S. patent application Ser. No. 15/063,234, filed Mar. 7, 2016, which is a continuation of U.S. patent application Ser. No. 13/417,896 filed Mar. 12, 2012, now U.S. Pat. No. 9,282,333, granted Mar. 8, 2016, which claims the benefit of Indian Provisional Patent Application No. 835/CHE/2011, filed in the Indian Patent Office on Mar. 18, 2011, all of which are incorporated herein by reference in their entireties.

TECHNICAL FIELD

The present disclosure generally relates to masking multimedia data.

BACKGROUND

The sharing of multimedia content has become rather important in modern human societies. However, with an extensive utilization of multimedia technology in various spheres of life, various privacy issues associated with multimedia content have also gained importance. In an exemplary scenario, "privacy masking" is used to mask private regions of multimedia content (for example, video content) so that the given region will not be revealed. For example, while interviewing someone who does not want her identity to be revealed, the face of the interviewee may be masked by utilizing privacy masking. As another example, while performing surveillance of a street, windows of adjoining houses may be masked so as to maintain or protect a level of privacy for these houses and their occupants.

SUMMARY

Various methods and systems for masking multimedia data are disclosed. In various embodiments, the masking of multimedia data may be performed for the purpose of maintaining privacy. In an embodiment, a computer implemented method of masking multimedia data includes performing a prediction for at least one multimedia data block based on a prediction mode of a plurality of prediction modes. The at least one multimedia data block is associated with a region of interest (ROI). A residual multimedia data associated with the at least one multimedia data block is generated based on the prediction. The method also includes performing a quantization of the residual based on a quantization parameter (QP) value. The QP value is variable such that varying the QO value controls a degree of masking of the ROI.

In one embodiment, a system for masking multimedia data is provided. The system includes a prediction module and a quantization module. The prediction module is configured to perform a prediction for at least one multimedia data block based on a prediction mode of a plurality of prediction modes. The at least one multimedia data block is associated with a ROI. The prediction module is further configured to generate a residual multimedia data associated with the at least one multimedia data block based on the prediction. The quantization module is communicatively associated with the prediction module. The quantization module is configured to perform a quantization of the residual based on a QP value. The QP value is variable such that varying the QP value controls a degree of masking of the region of interest.

Moreover, in an embodiment, an integrated circuit for masking of multimedia data is provided. The integrated circuit comprises a transceiver module, a multimedia processing module and a memory module. The transceiver module is communicatively associated with a plurality of multimedia resources and is configured to receive multimedia data from a multimedia resource. The multimedia processing module is communicatively associated with the transceiver module and is configured to perform masking of the multimedia data. The multimedia processing module comprises a prediction module and a quantization module. The prediction module is configured to perform a prediction for at least one multimedia data block based on a prediction mode of a plurality of prediction modes. The at least one multimedia data block is associated with a ROI. The prediction module is further configured to generate a residual multimedia data associated with the at least one multimedia data block based on the prediction. The quantization module is communicatively associated with the prediction module. The quantization module is configured to perform a quantization of the residual based on a QP value. The QP value is variable such that varying the QP value controls a degree of masking of the ROI. The memory module is communicatively associated with the transceiver module and the multimedia processing module, and is configured to store the multimedia data subsequent to the masking of the multimedia data.

BRIEF DESCRIPTION OF THE FIGURES

FIG. 1 illustrates a simplified overview of facilitating a masking of multimedia data in accordance with an exemplary scenario;

FIGS. 2A and 2B illustrate an exemplary implementation for facilitating a masking by utilizing various values of QP for multimedia data in accordance with an exemplary scenario;

FIG. 3 illustrates a process flow implementation for facilitating a masking of multimedia data in accordance with an embodiment;

FIG. 4 illustrates a system for facilitating a masking of multimedia data in accordance with an embodiment;

DETAILED DESCRIPTION

Figure 5:
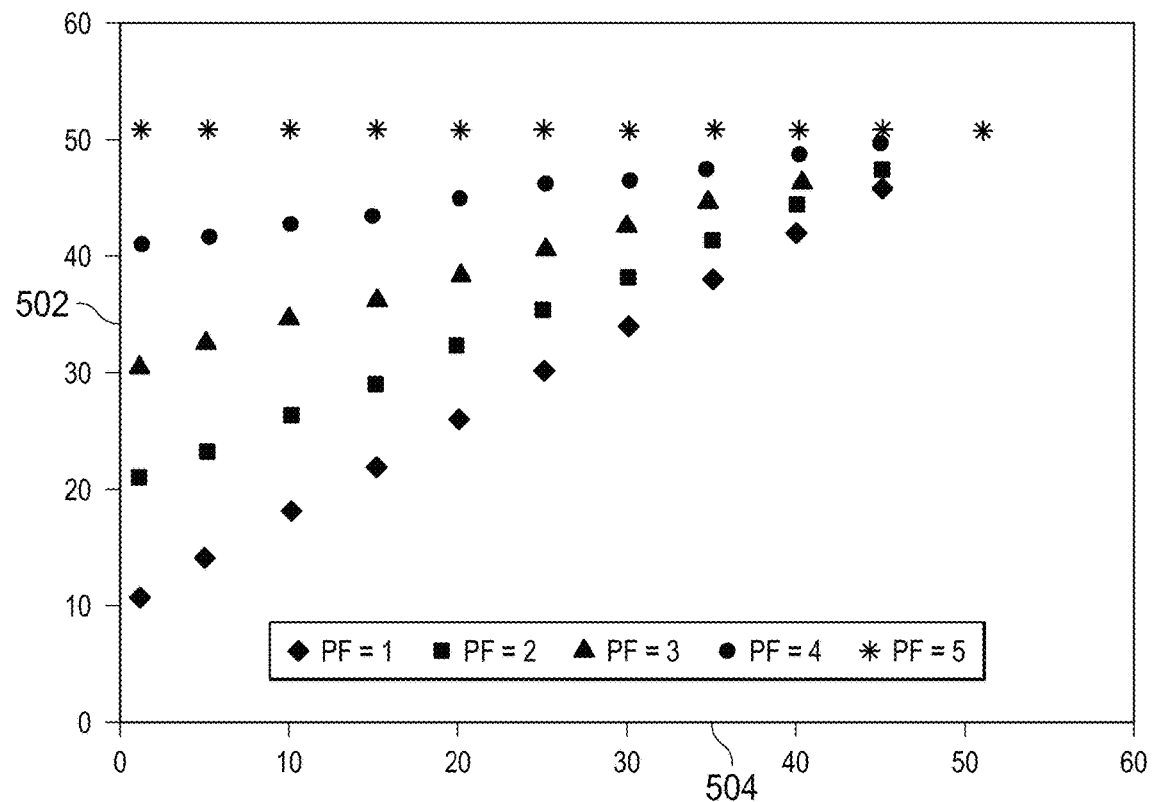
FIG. 5 illustrates a variation of values of QP for ROI against an average QP value for a current frame of multimedia data in accordance with an embodiment.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Pursuant to an exemplary scenario, a privacy masking technique is performed by processing multimedia data prior to encoding the video content. An exemplary embodiment explaining the preprocessing of the multimedia data for privacy masking is described herein with reference to FIG. 1.

FIG. 1 illustrates a simplified overview 100 of facilitating a masking of multimedia data in accordance with an exemplary scenario. In particular, the multimedia data may be captured at 102, such as by a multimedia capture device (e.g., a video capture device). An example of multimedia data may include, but is not limited to, video data captured by the video capture device. Examples of a video capture device may include a video camera or a camcorder. The video capture device may be, for example, a stand-alone device or a part of a mobile device, such as a Smartphone, or a data processing device, such as a personal computer, a laptop device or a personal digital assistant (PDA).

At 104, a preprocessing of the captured multimedia data is performed for privacy masking. In an exemplary embodiment, preprocessing of the multimedia data overwrites the portions of the multimedia data that are to be masked. In an embodiment, the portions of the multimedia data are masked with gray colored pixels. In one exemplary embodiment, the preprocessing comprises an image subtraction for masking the portions of the multimedia data. In particular, image subtraction includes subtracting the portions of the multimedia data that are to be masked by utilizing a fixed pattern image. In one exemplary embodiment, the preprocessing is performed by utilizing additional hardware/software to attenuate image details in the portions of the multimedia data. In an embodiment, various software preprocessing algorithms utilized to attenuate the details are configured to smooth or smudge the masked portions of the multimedia data (either in a spatial domain or a frequency domain).

Pursuant to an exemplary scenario, after the preprocessing, an encoding of the preprocessed multimedia data is performed at 106 to achieve the compression of the multimedia data. The multimedia data is to be compressed so as to efficiently utilize storage capacity during storage, or, to efficiently utilize spectrum/bandwidth during a transmission. A multimedia encoder may be configured within a multimedia system to encode the multimedia data. Examples of the multimedia system may include, but are not limited to: multimedia devices, such as cellular phones, digital video cameras and digital camcorders; data processing devices, such as personal computers, laptops and personal digital assistants; and consumer electronics, such as set top boxes, digital video disk (DVD) players and video network servers.

In an exemplary scenario, the multimedia encoder may be any machine capable of executing a set of instructions (sequential and/or otherwise) so as to perform an encoding of multimedia data. In an embodiment, the multimedia encoder is programmed to comply with a video compression standard. Examples of the video compression standards include, but are not limited to, video coding experts group (VCEG), H.120, H.261, moving pictures experts group (MPEG), MPEG-1 Part 2, H.262 or MPEG-2 Part 2, H.263, MPEG-4 Part 2, H.264 or MPEG-4 AVC, VC-2 (Dirac), high efficiency video coding (HEVC), and the like.

In an embodiment, the multimedia encoder receives pre-processed multimedia data. Pursuant to an exemplary scenario, the multimedia data may include a plurality of frames, and each frame from among the plurality of frames may include several blocks of multimedia data. The multimedia encoder determines a prediction for each block of multimedia data, and therefrom subtracts the corresponding original block of multimedia data to form residual multimedia data (or a residual). The prediction for each block of multimedia data may be performed based on previously encoded blocks of multimedia data, either from a current frame (e.g., intra-prediction) or from other frames that have been already been encoded and transmitted (e.g., inter-prediction). Identifying a suitable inter-prediction may be referred to as 'motion estimation', and subtracting the inter-prediction from the current block may be referred to as 'motion compensation'.

After prediction and subtraction, the residual multimedia data is transformed and quantized. The transformation of the residual multimedia data outputs a set of transform coefficients, each of which is a weighting value for an exemplary basis pattern. The weighted basis patterns, when combined, are capable of re-creating the residual multimedia data. The set of transform coefficients are then quantized by utilizing a quantization parameter (QP). In particular, each coefficient is divided by an integer value, which may be referred to as a scaling factor, thus effectively setting a number of transform coefficients to a zero value, so as to achieve compression.

The quantized transform coefficients, along with certain information (such as, for example, information about the structure of compressed data, information about a complete sequence of multimedia data and/or information that enables a decoder to re-create the prediction) are entropy encoded (e.g., converted into binary codes using variable length coding and/or arithmetic coding). The entropy encoding of the multimedia data produces an efficient, compact binary representation of the information in the form of encoded multimedia data. The encoded multimedia data may then be stored and/or transmitted.

At 108, the encoded multimedia data is decoded in order to achieve the decompression of the multimedia data. In an embodiment, the decoding of the encoded multimedia data may be performed by a decoder, such as a multimedia decoder. The multimedia decoder is configured within a multimedia system. In various embodiments, the multimedia data is decoded into the original multimedia data, or similar to the original frame, depending on the lossy/lossless compression technique that is implemented. In the multimedia decoder, the encoded multimedia data may be entropy decoded (e.g., converted from the binary form, first into intermediate symbols and thereafter into quantized transform coefficients) along with decoding of other encoded information. The quantized transform coefficients may be de-quantized (e.g. multiplied by the scaling factor and then inversely transformed) to obtain the residual multimedia data. The residual multimedia data may then be added (e.g. combined with predicted blocks configured from the other information decoded along with the quantized transform coefficients) to re-create the blocks of multimedia data. After the decoding, such as, for example, at 110, the decoded multimedia data may be displayed in a display device. Examples of the display device include, but are not limited to, a liquid crystal display (LCD). In an exemplary embodiment, the display device may be configured inside the system for privacy masking. Pursuant to one embodiment, however, the display device may be configured external to said system.

Pursuant to the above example, the preprocessing of the multimedia data is explained by various techniques, such as, for example, by graying the pixels of the portion of the multimedia content to be masked, by subtracting the portion in question from a fixed pattern image, by utilizing additional hardware/software, and the like. However, the above methods of privacy masking may have one or more disadvantages. For example, some of these methods include extra computation and/or the transfer of multimedia data to perform privacy masking, which can thereby degrade the performance of the multimedia solution. As a result, if the performance of a solution is to be increased, the cost of the solution will consequently increase. In some of the embodiments, wherein additional hardware is utilized for implementing privacy masking, the silicon area of the device incorporating the privacy masking system is increased, thereby increasing the overall cost. Additionally, it may be difficult to implement the preprocessing mechanisms in the existing devices that are devoid of in-built support for privacy masking solutions. Further, in various solutions, the portions of the multimedia data to be masked are completely replaced by another pattern, thereby leading to the substantial obscuring of the underlying objects. Such results may not be desirable in scenarios where the primary objective is to partially obscure the details of the objects/person in the multimedia data. For example, in the masking of a keypad in an ATM machine, it may be beneficial to obscure the key combinations that a user is inputting, although it may also be beneficial to nevertheless know whether the user is accessing the keypad or not. Thus, it may be beneficial to be able to control a degree of privacy.

In various other scenarios, due to the preprocessing of the multimedia data, an additional processing and Direct Memory Access (DMA) bandwidth are required, which thereby results in greater system cost and reduced performance. Preprocessing may also increase the end to end system latencies.

Various embodiments of the present technology, however, provide methods and systems for facilitating a masking at a region of interest (ROI) in a simple and effective manner by precluding (or enabling one to avoid) complex preprocessing techniques without incurring additional cost with respect to the hardware. For example, in an embodiment, the masking in the multimedia data may be provided by performing a prediction based on a worst prediction mode, thereby resulting in a substantially high residual multimedia data. This high residual multimedia data may thereafter be coded with a high value of the QP, thereby obscuring the details of the multimedia data. In various embodiments, the QP value may be varied so as to achieve a varying degree of masking of the multimedia data. An exemplary implementation of facilitating a masking in the multimedia data is illustrated in FIGS. 2A and 2B.

FIGS. 2A and 2B illustrate an exemplary implementation for facilitating a masking by utilizing various values of QP for multimedia data (e.g., for an image frame). In the exemplary embodiment illustrated in FIG. 2A, a frame 210 comprises a human face region 212, wherein the face region 212 is masked by utilizing a high QP value in the region 212. The masked face region is marked as 214. FIG. 2A also illustrates a multimedia data block view 220 of the frame 210. The multimedia data block view 220 is shown to include multimedia data blocks corresponding to the contents of the frame 210. For example, corresponding to the masked face region 212, the multimedia data block view 220 includes, for example multimedia data block 224, 226 enclosed within a region 228. In various embodiments, the face region that is to be masked may be referred to as a region of interest (ROI). For example, the ROI is illustrated as 212 and 228 in FIG. 2A.

In an embodiment, the blocks, such as blocks 224, 226, associated with the ROI 220 can be inter-predicted by utilizing a high QP value to perform a masking of the associated face portion 212. However, if the prediction in the ROI 212/228 is performed by utilizing an efficient prediction mode, the blocks (for example, 224, 226) lying at the ROI 212/228 will be inter-predicted properly, and, accordingly, a preselected level of privacy masking is not achieved in the face region corresponding these blocks. In an embodiment, such blocks may have been inter-predicted as 'skip-blocks' by an encoder. The skip-blocks are illustrated in FIGS. 2A and 2B.

For example, and with reference to FIG. 2B, an image frame 230 is illustrated with a corresponding multimedia data block view 240. The frame 230 comprises a face portion, for example, the face portion 232. The face portion 232 is shown to be masked in a masked region 234, and the corresponding portion in the multimedia data block view 240 is marked as 242. The masked region 242 is shown to include multimedia data blocks, such as 244, 246.

In an example embodiment, a portion 236 of the privacy masked region 234 remains unmasked, since the blocks, associated with said region were coded as skip-blocks. It is noted that, when the prediction in a region of a frame is good, the associated blocks are coded without sending a residual error or motion vectors, and the encoder records such blocks as skip-blocks. Also, a multimedia decoder may deduce the motion vector of the skip-block from the block that has already been decoded. As the blocks 244, 246 associated with the region 242 are coded as skip-blocks, there is no residual multimedia data is left, and merely increasing QP does not have an effect, which renders the ROI unaffected by the privacy masking.

With reference still to FIG. 2B, the frame 230 comprising the face region may include skip-blocks (such as blocks 244, 246), intra-predicted blocks (for example, blocks 248, 250), and inter-predicted block (for example, blocks 252, 254). In some embodiments, the blocks (for example the blocks 248, 250) that are placed adjacent to the ROI 242 are coded as intra-predicted blocks. Such blocks produce a spilling noise, thereby distorting the adjoining image. The phenomenon of the spilling noise is explained in more detail herein with reference to FIG. 7.

In the embodiments illustrated in FIGS. 2A and 2B, when the masking is performed by merely increasing the QP value of the multimedia data associated with the ROI, the prediction may be good, and, hence, the preselected level of privacy masking may not be achieved. Accordingly, it may be beneficial to perform the masking in a manner such that a suitable level of masking is achieved. In various embodiments, a more robust way of achieving a beneficial level of masking is to first perform a prediction based on a worst prediction mode, thereby generating a high residual multimedia data and enabling a better masking of the multimedia data to be achieved.

FIG. 3 illustrates a process flow implementation for facilitating a masking of multimedia data in accordance with an embodiment. Examples of multimedia data may include video data, image data, audio-video data and the like. In particular, blocks 302, 306, and 308 outline an exemplary process implementation for the capturing, decoding and displaying, respectively, of multimedia data, whereas block 304 outlines variations in a process implementation for the encoding of multimedia data. For example, at 302 of the masking process flow 300, multimedia data is captured by a multimedia capturing device, such as, for example, cellular phones, digital video cameras, digital camcorders, and the like.

The captured multimedia data is thereafter encoded at 304 in a manner that at least one portion of multimedia data is masked. In an embodiment, this aforementioned "at least a portion" is the ROI of the multimedia data, and comprises at least one multimedia data block. In various embodiments, the ROI may be masked based on a prediction mode that is configured to provide a worst prediction, thereby outputting substantially high residual multimedia data or residual energy. A quantization of the resultant/residual energy with a QP of high value is performed, thereby masking the information associated with the at least one portion of the multimedia data. In various embodiments, the QP value may be varied so as to control a degree of masking of the ROI. After encoding, at 306, the encoded multimedia data may be decoded and decompressed by, for example, a multimedia decoder. At 308, the decoded multimedia data may be displayed, such as using an exemplary process implementation for displaying multimedia data.

The disclosed process flow 300 provides solutions for the effective masking of multimedia data. However, in some embodiments, masking of the multimedia data may result in the production of a spilling noise. In a masked image frame, the spilling noise is represented by distortion of the regions adjacent to the ROI, which is a scenario that may be beneficial to avoid. Various embodiments provide solutions for privacy masking of the multimedia data without producing spilling effects. For example, in various embodiments, at least one guard band is provided in proximity to at least one boundary portion of the ROI. The at least one guard band is configured to prevent a spilling of the masking to the neighboring regions of the ROI. In some embodiments, for example, in case of intra-predicted frames, the at least one guard band may include a single guard band. In some embodiments, for example, in case of inter-predicted frames, the at least one guard band may include multiple guard bands. The concept of spilling noise and the guard bands is explained herein in more detail. Various embodiments of the present disclosure are further disclosed herein with reference to FIGS. 4 to 8.

FIG. 4 illustrates a system 400 for facilitating a masking of multimedia data (e.g., multimedia data 402) in accordance with an embodiment. Examples of multimedia data may include video data, image data, audio-video data and the like. In an embodiment, the system 400 may be a multimedia encoder. In one embodiment, the system 400 is a high efficiency video coding (HEVC) based video encoder. In one embodiment, the system 400 is (or includes) a moving pictures expert group (MPEG)-1 based video encoder, MPEG-2 based video encoder and/or MPEG-4 based video encoder. In an embodiment, the system 400 may be a stand-alone device or configured within a multimedia system. Examples of the multimedia systems may include, but are not limited to: multimedia devices, such as cellular phones, digital video cameras and digital camcorders; data processing devices, such as personal computers, laptops and personal digital assistants; and consumer electronics, such as set top boxes, digital video disk (DVD) players and video network servers.

In various embodiments, in order to perform a masking of at least a portion of the multimedia data, the at least one multimedia data block associated with at least the portion of the multimedia data is predicted. In various embodiments, the masking of the ROI is achieved by reducing the prediction effectiveness at the ROI, and, hence, increasing the residual energy. The at least one multimedia data block is predicted based on the DC prediction mode so as to generate predicted multimedia data blocks. The predicted multimedia data blocks are subtracted from the corresponding at least one multimedia data blocks to thereby generate residual multimedia data blocks of high residual energy. An increase in the residual energy facilitates a masking of the details of the multimedia data at the ROI.

The system 400 is depicted to include a prediction module 404, a quantization module 406, and an entropy encoding module 408. In various embodiments, the system 400 may also include a prediction mode determination module 410, a guard band determination module 412, a QP determination module 414, and a rate control module 416.

The prediction module 404 is configured to perform a prediction for at least one block of multimedia data. The at least one block of multimedia data is associated with the ROI. In various embodiments, the prediction for the at least one block of multimedia data 402 may be determined based on previously encoded blocks of multimedia data 402, either from a current frame (e.g., intra-prediction) or from other frames that have been already been encoded and transmitted (e.g., inter-prediction). In an embodiment, the prediction module 404 includes an inter-prediction module 418 and an intra-prediction module 420. The inter-prediction module 418 is configured to perform an inter-prediction of the at least one block of the multimedia data, while the intra-prediction module 418 is configured to perform an intra-prediction of the at least one block of the multimedia data. Various embodiments that include the masking of intra-predicted and inter-predicted multimedia data are explained herein in detail.

In various embodiments, the prediction module 404 is further configured to determine a residual multimedia data of the predicted multimedia data block and a corresponding original multimedia data block. In an embodiment, the prediction for the at least one block of the multimedia data is determined based on the prediction mode.

In various embodiments, the prediction mode determination module 410 is communicatively associated with the prediction module 404, and is configured to determine the prediction mode suitable to perform a masking of the multimedia data. In various embodiments, the prediction mode determination module 410 is configured to select the mode from the plurality of prediction modes. For example for performing intra-prediction, the prediction mode determination module 410 determines a plurality of values of SAD associated with the plurality of prediction modes. The prediction mode determination module 410 selects the mode from the plurality of modes based on the determined plurality of values of SAD. Particularly, the prediction mode determination module 410 selects the mode having a highest value of SAD, since the highest value of SAD is associated with worst prediction, and thereby adequate masking.

In various exemplary embodiments, the prediction mode determination module 410 is configured to select a DC mode for performing the prediction. In an embodiment, selecting the DC mode for performing the prediction facilitates in avoiding the computation required in calculating the plurality of values of SAD for the plurality of modes, thereby saving computation effort and processing time of the system.

In various embodiments, for example for inter-prediction, the prediction mode determination module 410 is configured to determine the prediction mode for the at least one multimedia data block. In the present embodiment, the prediction mode is determined by determining at least one motion vector (MV) between a reference frame and at least one masking frame of multimedia data. In an embodiment, the at least one masking frame includes the at least one multimedia data block. In an embodiment, at least one corner pixel associated with the reference frame is rendered grey, and a padding is performed for generating at least one padded portion in the reference frame. In an embodiment, the padding performed by using the at least one grey corner pixels results in generation of at least one grey corner portion. The at least one MV is caused to point towards the at least one grey corner portion to render the ROI grey. In the present embodiment, causing the at least one MV to point towards the at least one grey corner portion provides a high residual energy. The high residual energy is associated with a poor prediction, and thereby effective masking.

In various other embodiments, the prediction mode determination module 410 is further configured to determine various other prediction modes associated with the regions occupied by the at least one guard band. The prediction modes for the regions occupied by the guard bands will be explained later.

The guard band determination module 412 is communicatively associated with the prediction module 404, and is configured to determine at least one guard band in proximity to at least one boundary portion of the ROI. In various embodiments, the at least one guard band is configured to prevent a spilling of the masking outside of the ROI. For example, the guard band determination module 412 may determine or select a guard band towards a right-side boundary portion of the ROI and another guard band towards a bottom boundary portion of the ROI.

In an embodiment, the guard band determination module 412 is communicatively associated with the prediction mode determination module 410. In an exemplary embodiment, the prediction mode determination module 410 is further configured to determine a vertical prediction mode to perform a prediction in the at least one guard band at the right-side boundary portion of the ROI. In one exemplary embodiment, the prediction mode determination module 410 is configured to determine a vertical prediction mode so as to determine a horizontal prediction mode in order to perform the prediction in the at least one guard band at the bottom-side boundary portion of the ROI.

The quantization module 406 is communicatively associated with the prediction module 404, and is configured to transform and quantize the residual multimedia data output from the prediction module 404. In various embodiments, during quantization, the residual multimedia data is coded with a high QP value, thereby causing a reduction in the details of the object at the ROI by obscuring the information pertaining to such details.

In an embodiment, the quantization module 406 is also configured to receive an input from the QP determination module 414. The QP determination module 414 is configured to determine a variable QP value based on a degree of masking desired for the multimedia data. In various embodiments, the variable QP value may be based on a rate control. In an embodiment, the rate control may be determined by the rate control module 416 that is coupled with or connected to the QP determination module 414. In an embodiment, the rate control module 416 is configured to output an average QP (QPf) value for a current frame of multimedia data and provide the same to the QP determination module 414.

In various embodiments, the QP determination module 414 determines the QP value to achieve different levels of masking. In an exemplary embodiment, the QP determination module 414 determines the QP value (represented as QPpf) based on a piecewise linear equation which yields processing simplicity without impacting masking quality. In various embodiments, the following may be utilized for deriving the QP for the masked region:

$$QPpf = QPf + (PF*(QP\ max - QPf)/n)$$

wherein,

QPpf is the QP of the privacy masked region,

QPf is the average QP for the current frame given by the Rate control,

PF is a privacy factor with a value from 1-n, wherein n is an integer, and

QP max is the Max QP value to be used.

In an embodiment, the value of PF is based on the degree of masking to be implemented. For example, for various degrees of masking, the value of PF may be set in a range of 1-5.

In an embodiment, the bit consumption that changed in the ROI affects the overall bits consumed in the frame of the multimedia data. In an embodiment, the number of bits consumed in a previous frame is input to the rate control module 416, and the QPf of the next frame is modulated accordingly. Hence, there is no bitrate deviation in long term. A variation of QPpf (e.g., the QP value for ROI) against QPf (e.g., the average QP value for a current frame) is illustrated in FIG. 5.

FIG. 5 illustrates a variation of values of QPpf (QP for ROI, represented as 502) against the value of QPf (average QP value, represented as 504) for a current frame of multimedia data in accordance with an embodiment. In particular, for a variation of a privacy factor from 1 to 5, the value of QPpf is increasing with an increasing value of QPf until a threshold value of PF is reached. For example, in the illustrated variation, the maximum value of PF is 5. In an embodiment, at the maximum value of PF (for example, when the value of PF is 5), the variation between QPpf and QPf is linear.

With reference again to FIG. 4, in various embodiments, the quantization module 406 is configured to perform the transformation and quantization of the residual received from the prediction module 404 based on the variable QP received from the QP determination module 414. In particular, transformation of the residual multimedia data outputs a set of transform coefficients, each of which is a weighting value for an exemplary basis pattern. The weighted basis patterns, when combined, are capable of re-creating the residual multimedia data. The set of transform coefficients are then quantized (e.g., each coefficient is divided by an integer value, which may be referred to as a scaling factor), effectively setting a number of transform coefficients to a zero value so as to achieve compression.

The entropy encoding module 408 is coupled with or connected to the quantization module 406, and is configured to convert the quantized transform coefficients, along with certain information (for example, information about the structure of compressed data, information about a complete sequence of multimedia data 402 and/or information that enables a decoder to re-create the prediction) into binary codes using variable length coding and/or arithmetic coding. The entropy encoding of the multimedia data produces an efficient, compact, binary representation of the information in the form of encoded multimedia data 422. The encoded multimedia data 422 may then be stored and/or transmitted.

The system for masking multimedia data as explained in FIG. 4 may be implemented in a system without having an impact (or with relatively minimal impact) on the encoding process flow. For example, in the present implementation, no preprocessing step is involved to mask the ROI with a color, such as, for example, a gray color. Accordingly, an additional data load from the DDR to either subtract or overwrite the masked region may be avoided, and, therefore, the DMA data throughput remains the same as during a normal encoding flow. Also, in so much as the implementation of additional hardware for preprocessing may be avoided, the overall integration of the masking system is simple. This solution may utilize existing encoder modules/blocks to achieve privacy masking. Hence, it can be used in various existing hardware based solutions. Performing the privacy masking in a manner outlined in FIG. 4 enables the implementation of additional hardware, and complex pre-proceeding computations, to be avoided, in addition to minimizing cost and saving/conserving memory in a system for facilitating a privacy masking of the multimedia data.

An exemplary scenario indicating exemplary results of privacy masking in accordance with an embodiment are illustrated with reference to FIGS. 6a through 6c. It is noted that, in an embodiment, the exemplary results of privacy masking obtained pursuant to an exemplary implementation may prove to be very efficient.

Figure 6A:
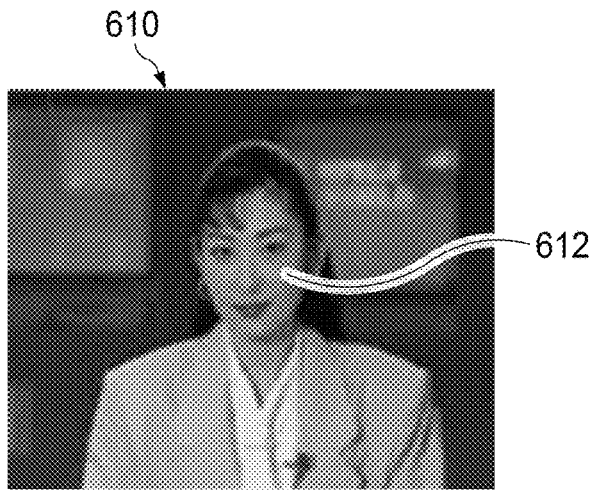
FIGS. 6A through 6C illustrate multimedia data being masked in accordance with an exemplary embodiment.
Figure 6B:
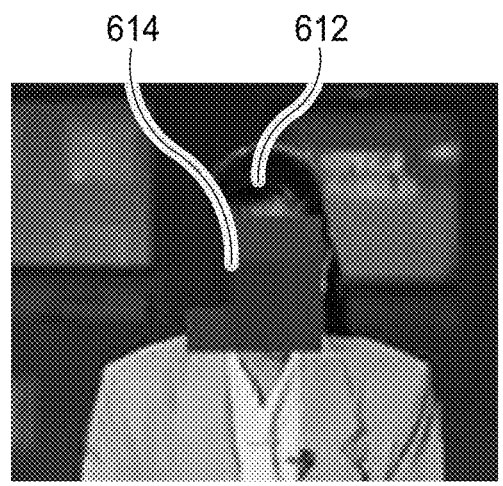
Figure 6C:
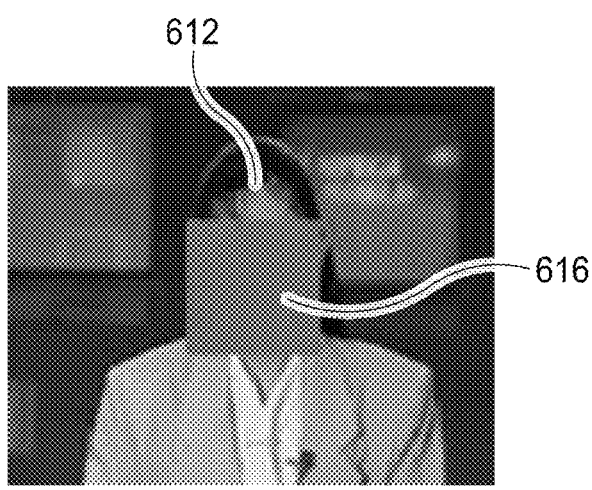

FIGS. 6A through 6C illustrate certain exemplary multimedia data being masked in accordance with an exemplary embodiment. Particularly, FIG. 6A illustrates a frame 610 comprising an exemplary face region, such as, for example, the face region 612, that is to be privacy masked. FIG. 6B illustrates the face region 612 being masked based on the intra-prediction. For example, the region labeled as 614 is the portion of the face region 612 that is masked based on the intra-prediction. FIG. 6C illustrates the face region 612 being masked based on the inter-prediction. For example, the region labeled as 616 is the portion of the face region 612 that is masked based on the inter-prediction. The masked face regions of FIGS. 6B and 6C are obtained by predicting the multimedia data blocks based on the DC prediction mode and, thereafter, applying a high QP value to obscure the details of the ROI, such as, for example, the face region 612.

In some embodiments, the multimedia data blocks are intra-predicted. The process of masking in the intra-predicted multimedia data blocks comprises predicting a weak intra-prediction mode that may poorly predict the multimedia data block. Selecting a weak intra-prediction mode facilitates a saving of the block level computation that would otherwise be performed when a mode with a maximum sum of absolute differences (SAD) is selected for intra-prediction. It is noted that SAD may be used to determine a motion estimation for video compression. In particular, SAD is indicative of a measure of the similarity between various blocks of multimedia data of a frame. The process implementation of SAD comprises determining an absolute difference between each pixel in the original block and the corresponding pixel in the block being used for comparison. These differences are summed to create a simple metric of block similarity.

In various embodiments, residual multimedia data blocks are computed by subtracting the intra-predicted multimedia data blocks from the original multimedia data blocks and are thereafter coded using a variable (but higher) QP value. Various multimedia standards, such as video coding standards, may provide specifications for implementation of the system for privacy masking (as described in FIGS. 4 and 6A, 6B, 6C) by utilizing the DC mode of intra-prediction. Various implementations of the disclosed masking technique as proposed for the multimedia coding standards, such as H.264 and MPEG4, is described in detail herein with reference to FIGS. 7 through 12.

Figure 7:
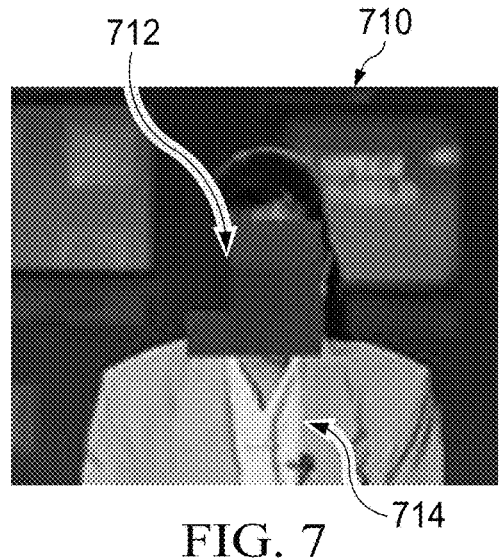
FIG. 7 illustrates an H.264 frame being masked in accordance with an embodiment.

FIG. 7 illustrates an H.264 frame 710 being masked in accordance with an embodiment. A masked region, for example, the region 712 is obtained by using the DC mode of intra-prediction. As illustrated in FIG. 7, performing the disclosed masking in ROI by utilizing the DC mode of intra-prediction causes a spill over prediction noise (represented by the region marked as 714) to spread in the unmasked region (or outside of the boundary of ROI). In order to avoid the spill-over to the unmasked regions, at least one guard band may be implemented.

In various embodiments, the at least one guard band is provided in proximity of at least one boundary portion of the ROI. The guard band is configured to contain the spilling effects of the DC mode to the un-masked region to thereby prevent the spilling of the masked image. The implementation of the guard band in the H.264 intra frame is explained in detail herein with reference to FIG. 8.

Figure 8:
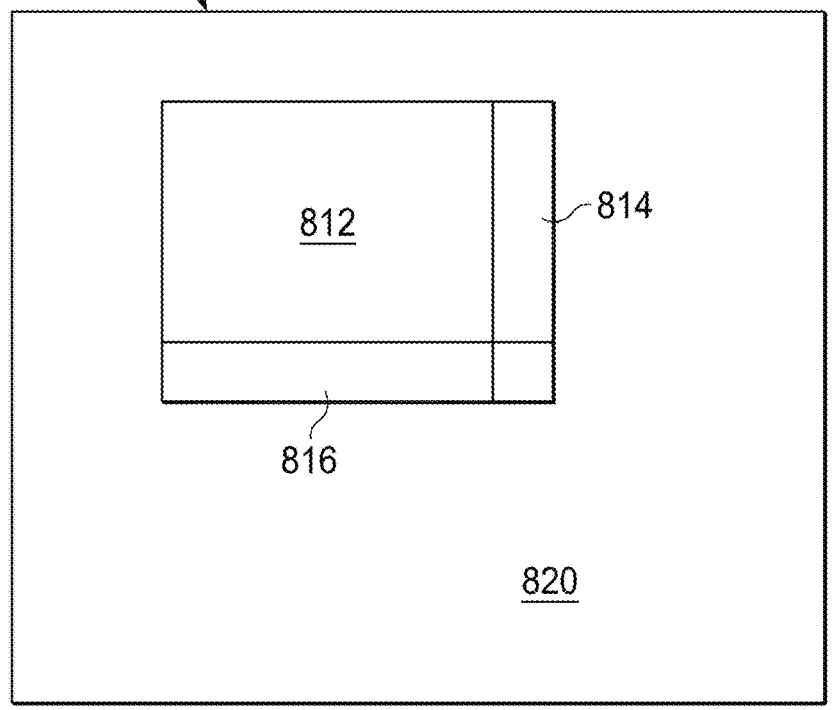
FIG. 8 illustrates an exemplary implementation of at least one guard band in a H.264 intra frame in accordance with an exemplary embodiment.

FIG. 8 illustrates an exemplary implementation of at least one guard band in a H.264 intra frame in accordance with an exemplary embodiment. As illustrated in FIG. 8, an H-264 intra frame, such as, for example, a frame 810 may include a ROI, such as, for example, a region marked as 812, that is to be masked. As explained herein with reference to FIG. 5, in the absence of a guard band, the privacy masking applied to the region 812 may spill into the regions adjacent to the ROI, thereby distorting the regions lying adjacent to the ROI 812, which is a scenario that may be beneficial to avoid. As discussed herein, at least one guard band is provided in at least one of the boundary regions of the ROI so that said spilling effect of the masked region can be contained.

As illustrated in FIG. 8, at least one guard band, such as, for example, a guard band 814 in a right-side portion, and a guard band 816 in the bottom portion, of the ROI 812 are provided. The region comprising the guard band 814 may be intra-predicted based on a vertical prediction, while the region comprising the guard band 816 may be predicted based on a horizontal prediction. The vertical prediction and the horizontal predictions in the regions lying on the right side and bottom side, respectively, of the ROI 812 ensure that none of the blocks of the multimedia data lying outside the ROI have prediction pixels overlapping thereon. As discussed herein with reference to FIG. 4, the horizontal projection and the vertical projection for the regions 814 and 816, respectively, may be determined by the prediction mode determination module (for example, the prediction mode determination module 410). It is noted that remainder of the region of the frame 810, for example, the region marked as 820, may be processed based on the best mode of intra-prediction with a minimum SAD.

In certain embodiments, the algorithmic implementation for performing a masking of an intra-predicted multimedia data block may be represented as follows:

--- if(Current multimedia data block is in ROI)
{

```
  Force intra-prediction mode as DC16x16 ( );
}
else if(Current multimedia data block is in right-side guard band)
{
  Force Vertical Intra-prediction ( );
}
else if(Current multimedia data is in bottom guard band)
{
  Force Horizontal Intra-prediction ( );
}
else
{
/*----------------------------------------------*/
/*Normal Flow                    */
/*Use the selected Best intra mode (min SAD)   */
/*----------------------------------------------*/
}
```

Still referring to FIG. 8, the at least one guard band for intra-prediction is shown and described to include two guard bands, for example, the guard band 814 and the guard band 816. It will, however, be understood that in various embodiment, the at least one guard band may include only one guard band, for example, the guard band 814 for preventing said spilling instead of multiple guard bands.

In various embodiments, a width of the at least one guard band may be equal to one multimedia data block. In an embodiment, the multimedia data block may comprise a macro-block, for example, of 16×16 pixels, and accordingly the width of the at least one guard band may be equal to 16 pixels only. In various other embodiments, the width of the multimedia data block may be lesser or more than one multimedia data block. For example, in certain embodiments, the at least one guard band such as the guard band 814 may be a sub-macro block wide only, for example 4 pixels wide.

Figure 9:
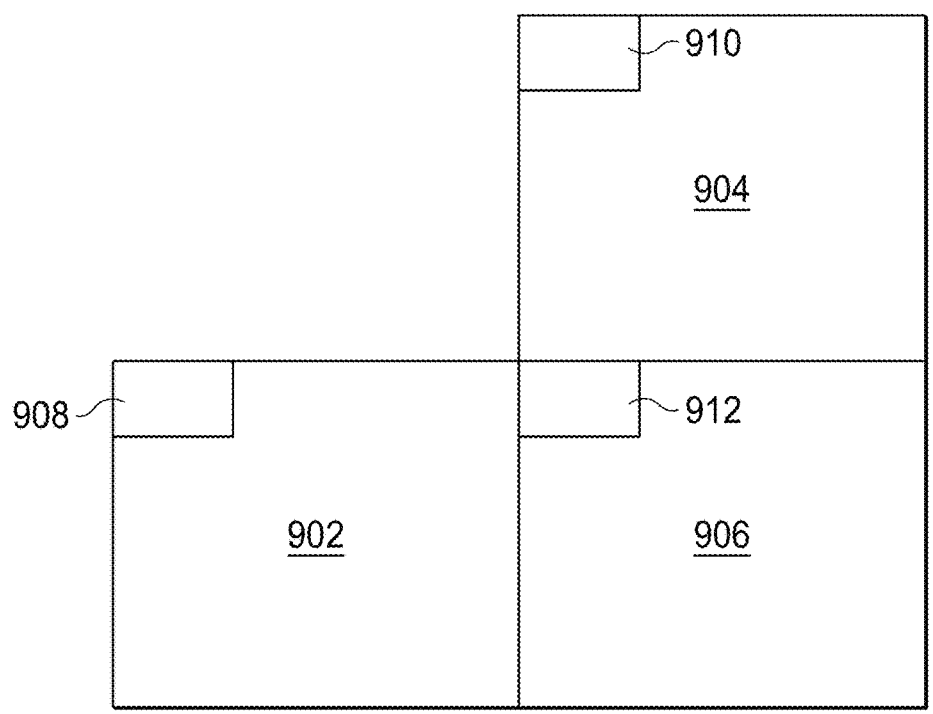
FIG. 9 illustrates a masking in an intra-frame (e.g., an MPEG4 frame) in accordance with an embodiment.

FIG. 9 illustrates a masking in an intra-predicted frame (e.g., an MPEG4 frame) in accordance with an embodiment. In particular, in MPEG4 standard, the intra-predicted multimedia data blocks are coded by determining a DC prediction and an AC prediction. The DC prediction in the MPEG4 standard is ON (or activated) by default for all of the macro blocks, while the AC prediction can be enabled or disabled by the encoder. In various exemplary embodiments, the encoder enables or disables the AC prediction by implementing an algorithm.

In various embodiments, in order to perform a privacy masking in the MPEG4 intra-predicted frame, an AC prediction may be switched OFF (or deactivated) for ROI, thereby ensuring that the ROI has the worst case prediction, such as, for example, the DC prediction. Unlike the H.264 standard, in the event of an MPEG4 standard, forcing the usage of merely the left multimedia data block, or merely the bottom multimedia data block, for prediction may not be possible. Also, switching OFF or deactivating the DC prediction for an intra-predicted multimedia data block may not be possible. Accordingly, in the event of the MPEG4 standard, the DC of the intra-predicted multimedia data block is predicted from either the left-side multimedia data blocks or the top multimedia data block DC values.

With reference still to FIG. 9, three neighboring multimedia data blocks, such as, for example, a block 902, a block 904 and a block 906, are illustrated. For a current multimedia data block 906, let us assume that the residual energies of the multimedia data block 902, 904, 906 are represented by blocks 908, 910, 912, respectively:

Label 912 is indicative of the DC energy of the current multimedia data block 906, Label 908 is indicative of the DC energy of the multimedia data block (block 902) appearing to the left of the current multimedia data block (block 906), and Label 910 is indicative of the DC energy of multimedia data block (block 904) appearing above the current multimedia data block (block 906), then if (abs(908-912)<abs(910-912))

```
{
  DC of the current multimedia data block is predicted from the left
multimedia data block
}
else
{
  DC of the current multimedia data block is predicted from the top
multimedia data block
}
```

Figure 10A:
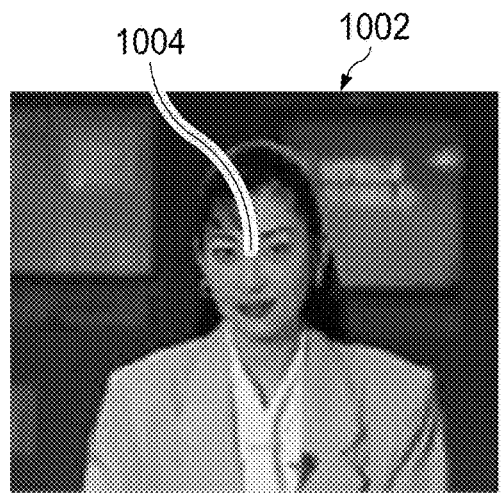
FIGS. 10A, 10B, 10C and 10D illustrate various stages of masking for inter-predicted frames in accordance with an exemplary embodiment.

In an embodiment, the predicted multimedia data blocks are subtracted from the corresponding original multimedia data blocks to obtain respective resultant or residual multimedia data blocks. A high QP value is applied to the residual multimedia data blocks so as to obtain privacy masking in the ROI. In the present embodiment, the QP of the multimedia data blocks associated with the masked region (or the ROI) is high, and, accordingly, the probability of selecting masked multimedia data blocks for DC prediction is much less, which thereby avoids the spilling effect. The privacy masking technique for the inter-predicted multimedia data blocks is explained herein with reference to FIGS. 10A-10D FIGS. 10A, 10B, 10C and 10D illustrate various stages of masking for inter-predicted frames in accordance with an exemplary embodiment. As illustrated in FIG. 10A, a frame 1002 is an inter-predicted frame. In an exemplary embodiment, the frame 1002 is assumed to include a face portion, such as, for example, the face portion 1004, which needs to be masked. Thus, the face portion 1004 is the ROI.

In order to perform a privacy masking, a prediction mode is determined for the inter-predicted frame 1002. In various embodiments, the prediction mode is determined to be a bad prediction mode that is configured to give a worst possible prediction in the ROI. In an embodiment, determining the prediction mode comprises pointing a motion vector (MV) towards a grey area in the image frame.

Figure 10B:
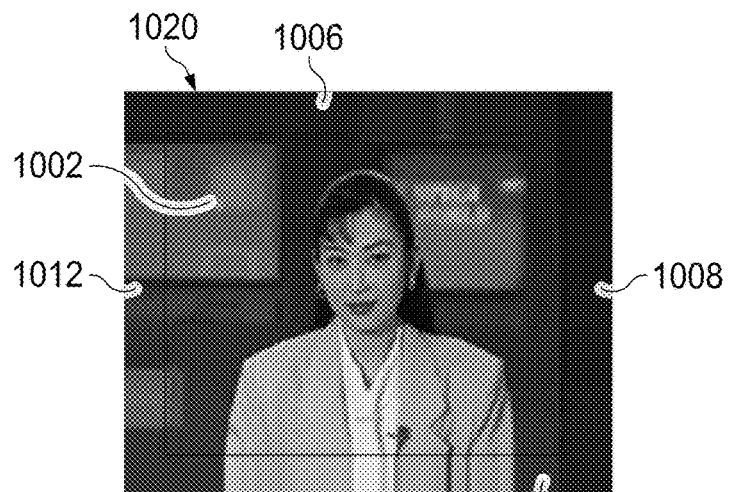
Figure 10C:

The inter-frame compression is performed by performing motion estimation based prediction for the multimedia data blocks in a predicted frame with respect to a reference intra-coded frame and/or previously coded inter-frames. In various video standards, the motion estimation may be extended beyond a reference intra-coded frame region. In certain cases, the multimedia 'content' can be derived outside the frame region by repeating the pixels of the edges of the frame so as to "fill" an extended region that may be used for motion estimation purposes. For example, as illustrated in FIG. 10B, the top row of the frame, such as, for example, the frame 1006, may be repeated in a vertical or upward direction, thereby expanding the image frame upwards so as to fill an extended motion estimation region below the picture. Likewise, the bottom row, the left and the right columns are repeated at the bottom, left and right sides, respectively, so as to provide extended motion estimation regions at those sides of the reference image frame. This process of filling areas outside of the original frame may be referred to as 'padding'. Padding may be very useful for the objects which are entering and leaving the frame. The process of padding is performed in video compression in order to improve the search.

In an embodiment, padding can be used to create a gray region in the reference frame without causing a substantial increase in data transfer during the process. This grey region can be utilized to perform a prediction during the masking process. In various embodiments, upon extending the edges of the frame 802 in all sides, the padded frame may appear as illustrated in FIG. 10B.

With reference still to FIG. 10B, a padded image 1020 that is obtained by padding the frame 1002 is illustrated. The padded region on all the four sides are illustrated by means of margins, such as, for example, the margins 1006, 1008, 1010, 1012. In the padded regions, one or more corners are made gray. For example, the pixels at a top left corner, a top right corner, a bottom left corner, and a bottom right corner, respectively, in the original image frame are converted to grey color. In an embodiment, when the reconstruction is proper, the pixels associated with these four corners remain grey.

When this image frame is padded, the grey pixels at one or more corners, such as, for example, the four corners, are expanded to make a multimedia data block lying outside of the boundary of the original image frame. For example, and with reference again to FIG. 8C, the four corners, such as the corners 1012, 1014, 1016 and 1018 are converted to grey. In various embodiments, each of the grey colored corner portions in the padded region comprises a multimedia data block of grey color. In various embodiments, during inter-prediction, the motion vector is forced to point to the grey multimedia data blocks, such as at multimedia data blocks 1012, 1014, 1016 and 1018 outside the frame boundary, thereby making the prediction image grey and hence yielding a huge residual.

Figure 10D:
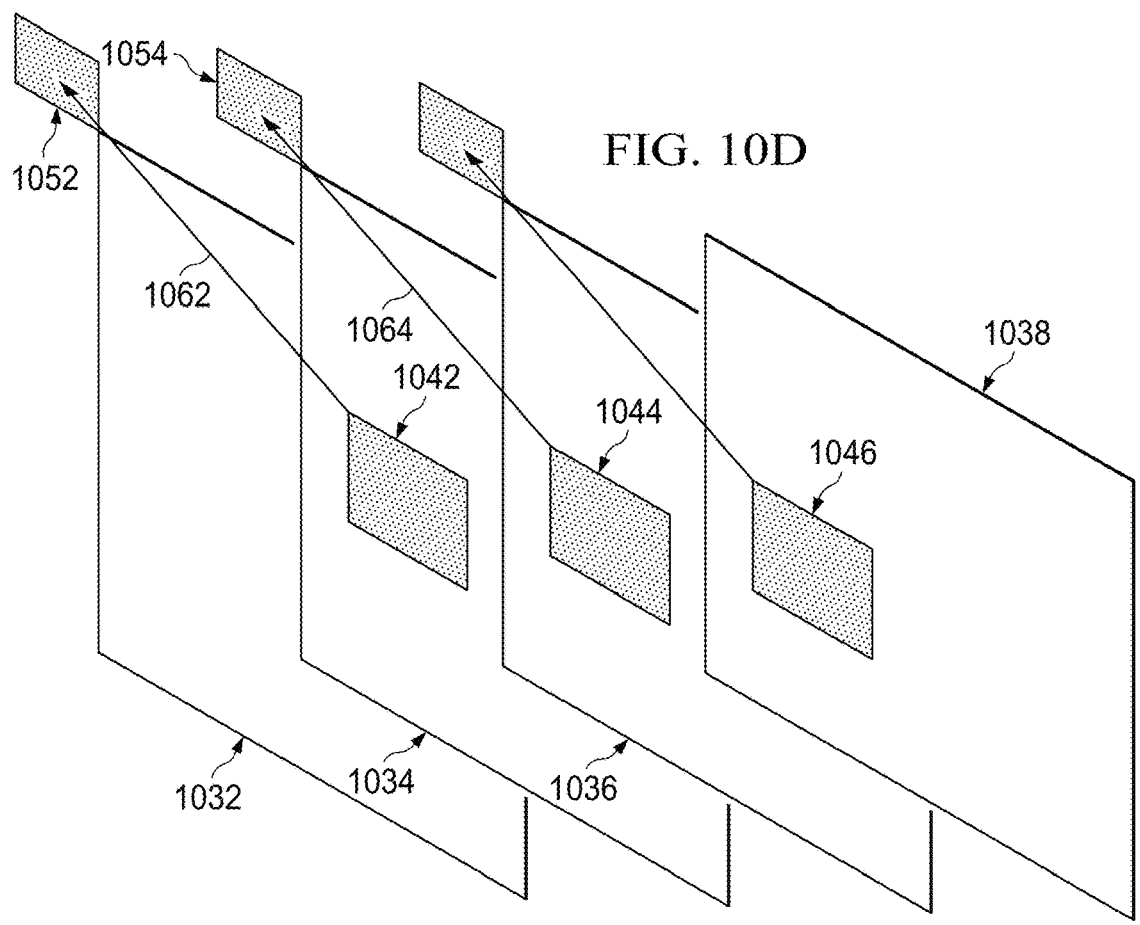

For example, referring to FIG. 10D, an exemplary image sequence comprising various frames, such as, for example, a frame 1032, 1034, 1036, and 1038, is shown. The frames comprise a portion that is desired to be masked (for example, the ROI). For example, a frame 1034 comprises a ROI, such as ROI 1042. Similarly, frames 1036 and 1038 comprise ROIs, such as ROI 1044 and 1046, respectively. In an embodiment, one of the frames from among the sequence of frames, such as, for example, the frame 1032, is a reference frame. As illustrated in FIG. 10D, the reference frame 1032 comprises an extended gray multimedia data block, such as, for example, the multimedia data block 1052. In various exemplary embodiments, the MV associated with the ROI of one or more other frames in the sequence points towards the grey multimedia data block 1052 of the reference frame 1032. For example, a MV 1062 of the frame 1034 may point towards the grey multimedia data block 1052 of the reference frame, the MV 1064 of the frame 1036 may point towards the grey multimedia data block 1054 of the frame 1034, and so on.

In certain video standards, a maximum length of a motion vector is specified. Accordingly, in one embodiment, a grey colored multimedia data block is chosen, out of the four grey colored multimedia data blocks, that is closest to the ROI. In an embodiment, only the luminance pixels can be made as gray in order to generate a sufficient amount of masking. In certain other embodiments, chrominance pixels can also be made gray in order to achieve a better degree of masking.

The masking technique for inter-predicted frames as disclosed herein may be used in various video standards, such as, for example, H.264 video standard, and MPEG4 video standard. The above process of privacy masking enables additional complexity and cost in the design to be avoided, as the padding is done automatically in the multimedia encoder and decoder such that unrestricted motion vector support may be achieved. Accordingly, pursuant to one exemplary implementation, the graying of the corner multimedia data blocks in a reconstructed image incurs no additional cost.

Figure 11A:
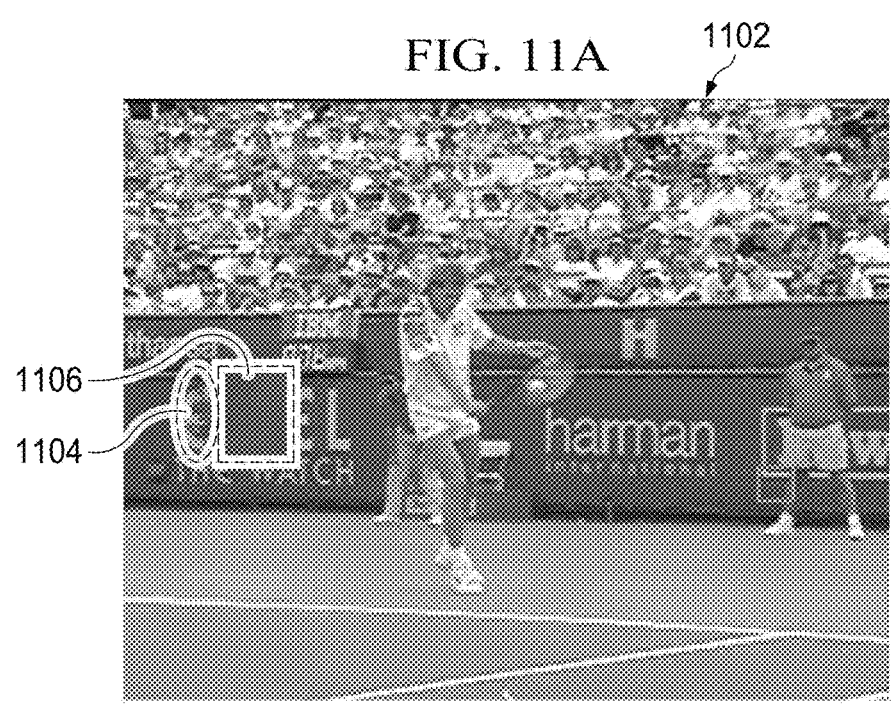
FIGS. 11A and 11B illustrate a masking for multimedia data associated with a high degree of motion in accordance with an embodiment.
Figure 11B:
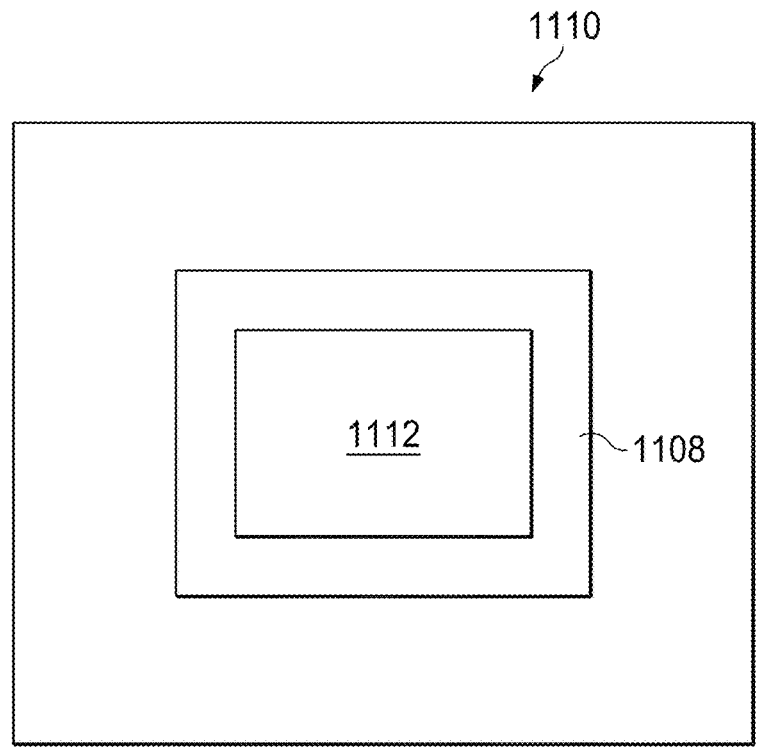

FIGS. 11A and 11B illustrate an exemplary masking for multimedia data associated with a high degree of motion in accordance with an embodiment. With reference to FIG. 11A, a frame 1102 comprising a scene associated with a high degree of motion is depicted. Particularly, the scene comprises a player playing a game. When the multimedia data, such as, for example, the video content, comprises a high degree of motion, the un-masked region (for example, the region marked as 1104) can refer to the masked region (for example, the region marked as 1106) of the previous picture (e.g., the reference picture), and, accordingly, the reconstructed image for these multimedia data blocks in the current frame may become distorted. For example, as illustrated in FIG. 11A, the portion 1104 of the image lying in close proximity to the ROI, such as, for example, the region 1102 is distorted due to the high degree of motion in the multimedia content.

In order to ensure a good quality reconstruction of the un-masked region, a mode decision of the region around the masked region may be biased towards intra modes. In an embodiment, the mode decision around the masked region may be biased by implementing 'guard bands' around the masked regions. The implementation of guard bands with respect to the inter-predicted frames is explained in detail with reference to FIG. 11B.

Referring to FIG. 11B, an implementation of the at least one guard band, such as, for example, a guard band 1108 in an inter-predicted frame 1110, is illustrated in accordance with an embodiment. In an embodiment, the inter-predicted frame 1110 comprises an area that is to be masked (e.g., a ROI), such as, for example, an area 1112. The area 1112 that is to be masked, or that is already masked, may be referred to as a masked region. In an embodiment, the at least one guard band 1102 may be provided around the masked region 1112 in order to avoid the masked region 1112 to distort the picture clarity of the area in close proximity thereof.

In various embodiments, the distortion of the regions adjoining the masked area 1112 may be unnoticeable or insignificant, thereby enabling the application of the guard band around the masked area to be avoided. Also, in such a scenario, the implementation of the guard bands may be configurable and selected based on the need of the application incorporating a privacy masking. For example, the at least one guard band 1108 may include four guard bands, each adjacent to one of the four boundary regions of the masked region 1112. However, it will be understood that the at least one guard band may include one or more than one guard bands, without limiting the scope of the present embodiment.

In various embodiments, a width of the guard band may be equal to one multimedia data block. In an embodiment, the multimedia data block may comprise a macro-block, for example, of 16×16 pixels, and accordingly the width of guard band may be equal to 16 pixels only. In various other embodiments, the width of the multimedia data block may be lesser or more than one multimedia data block. For example, in certain embodiments, the guard band 1108 may be a sub-macro block wide only, for example 4 pixels wide.

In an exemplary embodiment, an exemplary pseudo-code for determining the prediction with respect to inter-predicted frames may be implemented as follows:

```
if(Current multimedia data block is in masked region)
{
    ForceMVtoReferGrayRegion( );
}
else if(IsIntraBiasIncluded)
{

CheckForGaurdBandRegionandBiasIntra( );

}
else
{
/*----------------------------------------------*/
/*Normal Flow                                  */
/*Use the selected Best inter mode (min SAD)   */
/*----------------------------------------------*/
}
```

Figure 12:
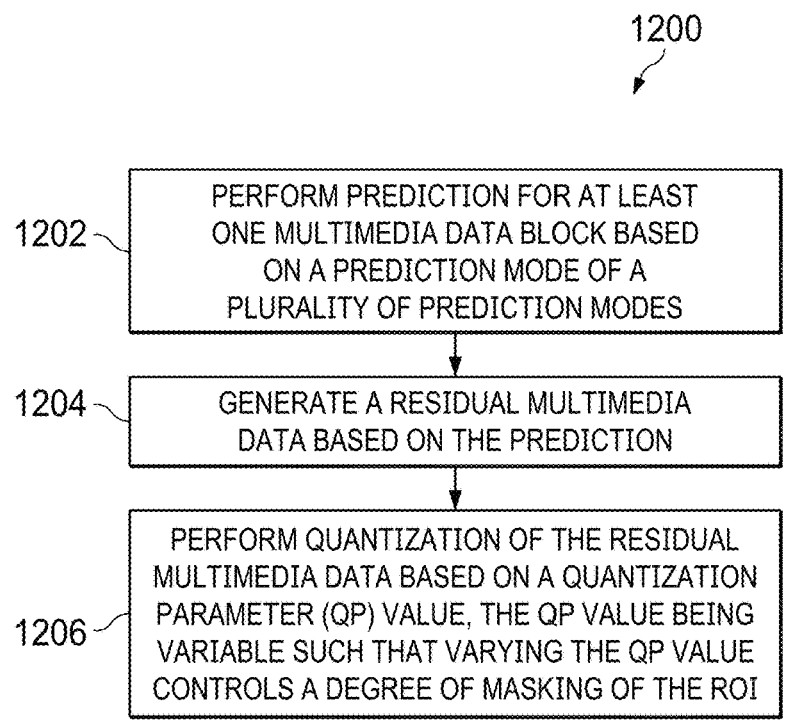
FIG. 12 is a flow diagram of a method of masking multimedia data in accordance with an embodiment.

FIG. 12 is a flow diagram of a method 1200 for masking multimedia data according to an embodiment. The method 1200 starts at operation 1202. At operation 1202, a prediction for at least one multimedia data block is performed. In an embodiment, the at least one multimedia data block is associated with a ROI. In various embodiments, the prediction is performed based on a prediction mode. In an embodiment, the prediction is performed based on DC prediction mode.

In various embodiments, at least one guard band can be determined in proximity to at least one boundary portion of the ROI. The at least one guard band is configured to prevent a spilling of the masking to neighboring regions of the ROI (or outside the ROI boundary). The determination of at least one of the guard bands for intra-predicted multimedia data blocks and for inter-predicted multimedia data blocks have already been discussed herein with reference to FIGS. 8 and 10A-10B, respectively.

In various embodiments, performing the prediction comprises performing the prediction in the at least one guard band at a right-side boundary portion of the ROI based on a vertical prediction mode, and performing a prediction in the at least one guard band at a bottom boundary portion of the ROI based on a horizontal prediction mode. As discussed herein with reference to FIG. 4, the prediction modes, such as, for example, the horizontal prediction mode and the vertical prediction mode are determined by the prediction mode determination module 410.

In accordance with certain embodiments, however, wherein the prediction is an inter-frame prediction, determining the inter-frame prediction comprises predicting the at least one multimedia data block by determining at least one MV between a reference frame and at least one masking frame. The at least one masking frame comprises the at least one multimedia data block. The determination of the at least one MV between the reference frame and the at least one masking frame is explained herein with reference to FIG. 10D.

At operation 1204, a residual multimedia data is generated based on the prediction. In various embodiments, the residual multimedia data is a differential of the original multimedia data and the predicted multimedia data. Particularly, the residual multimedia data is indicative of a change in the content of the original multimedia data and the predicted multimedia data. In various embodiments, the generated residual multimedia data is high for causing masking of the multimedia data associated with ROI.

In various embodiments, generating the residual multimedia data comprises generating at least one padded portion in a reference frame, and creating at least one grey corner portion in the at least one padded portion. The at least one MV is caused to point towards the at least one grey corner portion to thereby render the ROI grey. The generation of the residual multimedia data by greying the corner portions of the at least one padded portion is explained in detail with reference to FIGS. 10A-10D.

At operation 1206, a quantization of the residual multimedia data is performed based on a value of a QP. In an embodiment, the quantization of the residual multimedia data is performed by the quantization module 406 (see, e.g., FIG. 4). In various embodiments, the value of the QP is variable such that a varying of the value of the QP controls a degree of masking of the ROI. In an embodiment, the variable values of QP may be generated by QP determination module 414 (as explained herein with reference to FIG. 4) based on a rate control of the current frame. In an embodiment, the rate control may be determined by the rate control module 416 (see, e.g., FIG. 4).

In an embodiment, the value of the QP is configured to control the degree of masking of the ROI based on the following equation:

$$QPpf = QPf + (PF*(QP\,max - QPf)/n),$$

where
PF is a privacy factor associated with the degree of masking, and wherein the value of PF varies from 1-n,
QPf is an average QP value for a frame comprising the at least one MB, the value of QPf being determined by the Rate control,
QPpf is a value of QP at the ROI, and
QP max is a maximum permissible value of the QP.

Figure 13:
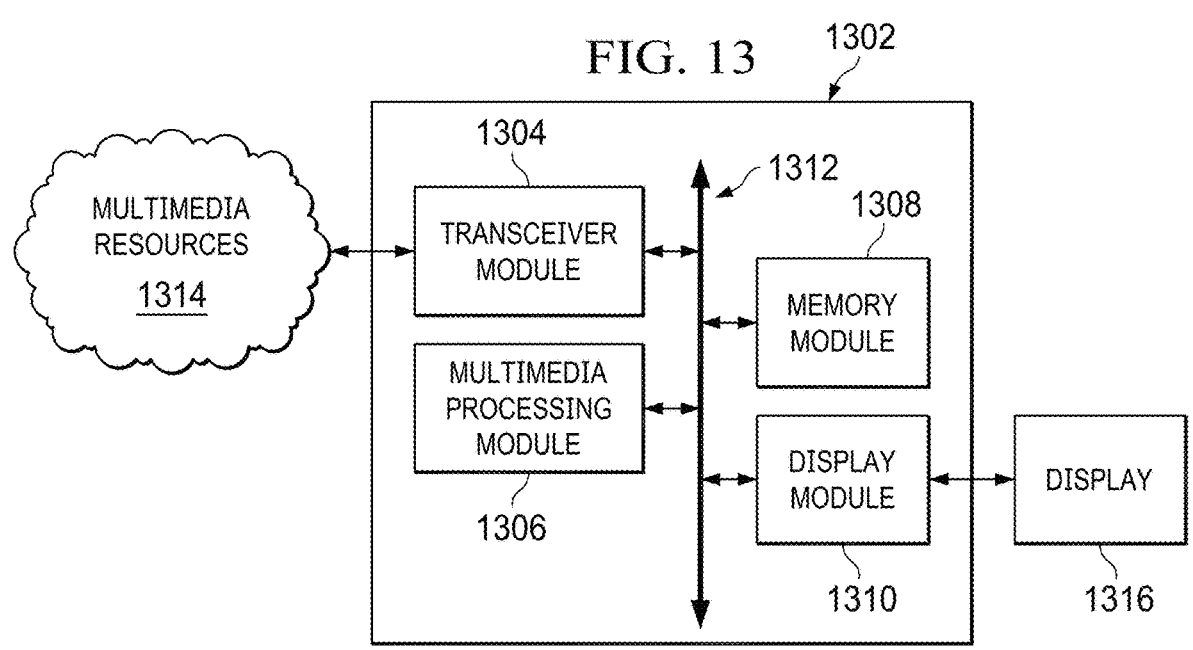
FIG. 13 is a block diagram of an integrated circuit for masking of multimedia data in accordance with an embodiment.

FIG. 13 is a block diagram of an integrated circuit 1302 for decoding and encoding multimedia data, according to an embodiment. The integrated circuit 1302 comprises a transceiver module 1304, a multimedia processing module 1306, a memory module 1308 and a display module 1310. The transceiver module 1304, the multimedia processing module 1306, the memory module 1308 and the display module 1308 are communicatively associated with each other using data path 1312.

The transceiver module 1304 is communicatively associated with a plurality of multimedia resources 1314 and is configured to receive multimedia data from a multimedia resource from among the plurality of multimedia resources 1314. Examples of the multimedia resources may include, but are not limited to (1) remote multimedia systems, (2) media capture devices like surveillance camera, camcorders and the like, and (3) multimedia storage devices like magnetic tapes, disks, computer readable media and the like. In an embodiment, the transceiver module 1306 may include an antenna and/or network connectors to connect to wired networks (for example, local area networks (LANs)) and wireless networks (for example, cellular networks) or combination thereof (for example, internet). Examples of network connectors may include a universal serial bus (USB) interface, a wireless LAN interface, an infrared interface, an Ethernet port and the like.

The multimedia processing module 1306 is configured to perform masking of the multimedia data. In an embodiment, the transceiver module 1304 is configured to receive the multimedia data provide the multimedia data to the multimedia processing module 1306. The multimedia processing module 1306 is configured to facilitate masking of the multimedia data, and provide the masked multimedia data to the memory module 1308 for storing, or to the display module 1310 for displaying masked multimedia media on the display 1316.

In an embodiment, the multimedia processing module 1306 may be configured to encode the multimedia data and provide the multimedia data to transceiver module 1304 for transmission purposes or to memory module 1308 for storage purposes. In an embodiment, the multimedia processing module 1306 may be configured to include components of system 400 explained in FIG. 4. For example, the multimedia processing module 1306 may include components of system 400 such as the prediction module 404, the quantization module 406, the entropy encoding module 408, the prediction mode determination module 410, the guard band determination module 412, the QP determination module 414, and the rate control module 416. The components of the system 400 included in the multimedia processing module 1306 are not explained herein for sake of brevity.

The memory module 1308 is configured to store the multimedia data subsequent to masking of the multimedia data. Examples of memory module 1306 may include, but are not limited to, random access memory (RAM), dual port RAM, synchronous dynamic RAM (SDRAM), double data rate SDRAM (DDR SDRAM), and the like. The display module 1310 is configured to facilitate display of the multimedia data on display 1316. Examples of display 1316 may include a light crystal display (LCD) panel, a plasma display panel, a field emission display and the like.

In an embodiment the integrated circuit 1302 may be an application processor chip. In an embodiment, the integrated circuit 1302 may be a part of general processor chip embedded within a multimedia system. Examples of the multimedia systems may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers.

Without in any way limiting the scope, interpretation, or application of the claims appearing below, advantages of one or more of the exemplary embodiments disclosed herein include providing a masking of multimedia data without any additional hardware, as well as enabling the implementation of complex computations to be avoided. For example, various embodiments provide privacy masking methods and systems that are tightly coupled with the logic of the multimedia encoder and do not depend on external processing to achieve a degree of masking. Said techniques have a unique advantage in that they may be used in existing devices/solutions which were not originally designed to enable privacy masking.

Another advantage of the disclosed methods for masking is that an additional data load from the DDR to either subtract or overwrite the masked region may be avoided. The DMA data throughput that is to be realized remains the same as in the normal encoding flow. Accordingly, there is no impact on the DMA bandwidth. Additionally, for the implementation of the disclosed methods and systems, the implementation of additional internal and external memory, as compared to normal encoding flow, may be avoided. Moreover, since there is no need for any preprocessing steps/hardware to mask the ROI, the overall system integration is simple. Furthermore, due to the minimal impact on performance without an increase in DDR bandwidth, the cost of the system is much less.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated circuit (ASIC) circuitry and/or in Digital Signal Processor (DSP) circuitry).

Particularly, the system 400 of FIG. 4, the prediction module 404, the quantization module 406, the entropy encoding module 408, the prediction mode determination module 410, the guard band determination module 412, the QP determination module 414, and the rate control module 416 of FIG. 4 may be enabled using software and/or using transistors, logic gates, and electrical circuits (e.g., integrated circuit circuitry such as ASIC circuitry).

Embodiments of the present disclosure include one or more computer programs stored or otherwise embodied on a computer-readable medium, wherein the computer programs are configured to cause a processor to perform one or more operations. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
   receiving, by at least one processor, a frame comprising a video block;
   in response to determining that the video block is in a privacy mask region of the frame:
     selecting, by the at least one processor, a selected intra-prediction mode to be a higher loss intra-prediction mode of a first intra-prediction mode or a second intra-prediction mode; and
     performing, by the at least one processor, prediction on the video block in accordance with the selected intra-prediction mode, to produce a predicted video block;
   quantizing, by the at least one processor, the predicted video block, to produce a quantized block; and
   encoding, by the at least one processor, the quantized block, to produce an encoded block.

2. The method of claim 1, further comprising performing prediction on the video block, to generate the predicted video block, in response to determining that the video block is not included in the privacy mask region, not privacy masking the video block.

3. The method of claim 1, further comprising transmitting the encoded block.

4. The method of claim 1, further comprising storing the encoded block.

5. The method of claim 1, wherein receiving the frame comprises receiving the frame from a video capture device.

6. The method of claim 1, further comprising:
   determining at least one guard band in proximity to at least one boundary portion of the privacy mask region.

7. The method of claim 6, further comprising:
   performing prediction in the at least one guard band configured at a right-side boundary portion of the privacy mask region based on a vertical intra-prediction mode; and
   performing prediction in the at least one guard band configured at a bottom boundary portion of the privacy mask region based on a horizontal intra-prediction mode.

8. The method of claim 1, further comprising:
   generating a residual block based on the predicted video block; and
   performing quantization of the residual block based on a quantization parameter (QP) value, the QP value being variable such that varying the QP value controls a degree of masking of the privacy mask region.

9. The method of claim 1, further comprising:
   rendering at least one corner pixel associated with a reference frame grey;
   generating at least one padded portion in the reference frame, the at least one padded portion comprising at least one grey corner portion generated by using the at least one corner pixel; and
   causing at least one motion vector to point towards the at least one grey corner portion to render the privacy mask region grey.

10. A device, comprising
    one or more processors; and
    a non-transitory computer readable storage medium storing a program for execution by the one or more processors, the program including instructions causing the one or more processors to:
      receive a frame comprising a video block;
      in response to determining that the video block is in a privacy mask region of the frame:
        select a selected intra-prediction mode to be a higher loss intra-prediction mode of a first intra-prediction mode or a second intra-prediction mode; and
        perform prediction on the video block in accordance with the selected intra-prediction mode, to produce a predicted video block;
      quantize the predicted video block, to produce a quantized block; and
      encode the quantized block, to produce an encoded block.

11. The device of claim 10, wherein the instructions further comprise instructions to perform prediction on the video block, to generate the predicted video block, in response to determining that the video block is not included in the privacy mask region, not privacy masking the video block.

12. The device of claim 10, wherein the instructions further comprise instructions to transmit the encoded block.

13. The device of claim 10, wherein the instructions further comprise instructions to store the encoded block in the non-transitory computer readable storage medium.

14. The device of claim 10, further comprising a camera configured to obtain the frame.

15. The device of claim 10, wherein the instructions further comprise instructions to:
    determine at least one guard band in proximity to at least one boundary portion of the privacy mask region.

16. The device of claim 15, wherein the instructions further comprise instructions to:
    perform prediction in the at least one guard band configured at a right-side boundary portion of the privacy mask region based on a vertical intra-prediction mode; and
    perform prediction in the at least one guard band configured at a bottom boundary portion of the privacy mask region based on a horizontal intra-prediction mode.

17. The device of claim 10, wherein the instructions further comprise instructions to:
    generate a residual block based on the predicted video block; and
    perform quantization of the residual block based on a quantization parameter (QP) value, the QP value being variable such that varying the QP value controls a degree of masking of the privacy mask region.

18. The device of claim 10, wherein the instructions further comprise instructions to:
    render at least one corner pixel associated with a reference frame grey;
    generating at least one padded portion in the reference frame, the at least one padded generate comprising at least one grey corner portion generated by using the at least one corner pixel; and cause at least one motion vector to point towards the at least one grey corner portion to render the privacy mask region grey.

19. A non-transitory computer readable storage medium storing a program for execution by one or more processors, the program including instructions to cause the one or more processors to:
   receive a frame comprising a video block;
   in response to determining that the video block is in a privacy mask region of the frame:
      select a selected intra-prediction mode to be a higher loss intra-prediction mode of a first intra-prediction mode or a second intra-prediction mode; and
      perform prediction on the video block in accordance with the selected intra-prediction mode, to produce a predicted video block;
   quantize the predicted video block, to produce a quantized block; and
   encode the quantized block, to produce an encoded block.

20. The non-transitory computer readable storage medium of claim 19, wherein the instructions further comprise instructions to perform prediction on the video block, to generate the predicted video block, in response to determining that the video block is not included in the privacy mask region, not privacy masking the video block.

\* \* \* \* \*